United States Patent [19]

Hishinuma et al.

[11] Patent Number: 4,747,052
[45] Date of Patent: May 24, 1988

[54] RADIATION IMAGE PROCESSING

[75] Inventors: Kazuhiro Hishinuma; Takeshi Funahashi; Masamitsu Ishida, all of Kanagawa, Japan; James T. Karam, Jr., Monroe, Conn.

[73] Assignee: Philips Medical Systems, Inc., Shelton, Conn.

[21] Appl. No.: 791,678

[22] Filed: Oct. 28, 1985

[30] Foreign Application Priority Data

Nov. 14, 1984 [JP] Japan ................................. 59-240361
Nov. 14, 1984 [JP] Japan ................................. 59-240362

[51] Int. Cl.$^4$ ............................................. H04N 1/40
[52] U.S. Cl. ..................... 364/414; 364/514; 358/284; 358/111
[58] Field of Search ................. 364/414, 515; 350/284

[56] References Cited

U.S. PATENT DOCUMENTS

| 4,315,318 | 2/1982 | Kato et al. | 364/414 X |
| 4,317,179 | 2/1982 | Kato et al. | 364/414 X |
| 4,346,409 | 8/1982 | Ishida et al. | 364/414 X |
| 4,387,428 | 6/1980 | Ishida et al. | 364/414 |
| 4,394,737 | 7/1983 | Komaki et al. | 364/414 |

Primary Examiner—Joseph Ruggiero
Assistant Examiner—Charles B. Meyer
Attorney, Agent, or Firm—Jack E. Haken

[57] ABSTRACT

A method and apparatus for image processing on a radiation image which may be a conventional radiographic image on X-ray film or a radiation image which is stored in a stimulable phosphor and read out therefrom. The radiation image is scanned by a light beam or stimulating rays and an image signal is obtained by use of a photodetector. The image signal is subjected to a frequency processing by use of an unsharp masking process. The unsharp mask signal (Sus) is used for conducting an operation of $$Sorg + \beta(Sorg - Sus)$$

to obtain an image-processed signal S, wherein Sorg is a digital signal for each picture element of the scanned image and $\beta$ is a frequency emphasizing coefficient. The median of a group of digital signals in an unsharp mask of a predetermined size is employed.

13 Claims, 5 Drawing Sheets

F I G. IA
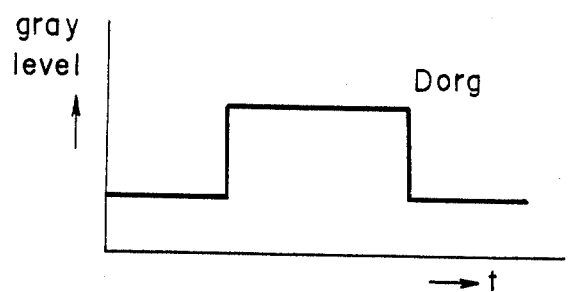
F I G. IB
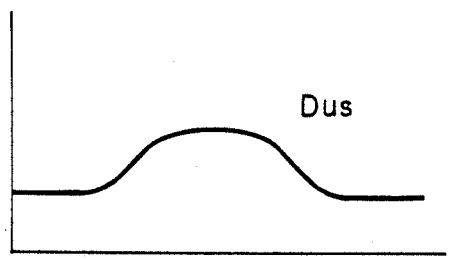
F I G. IC
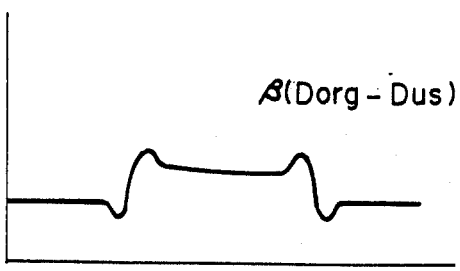
F I G. ID
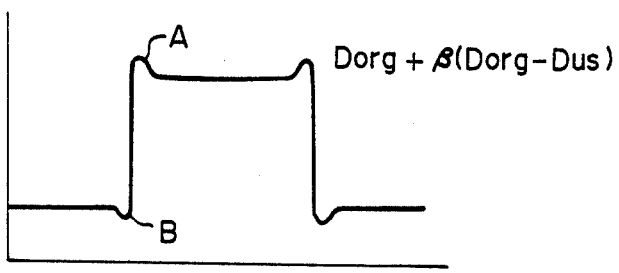

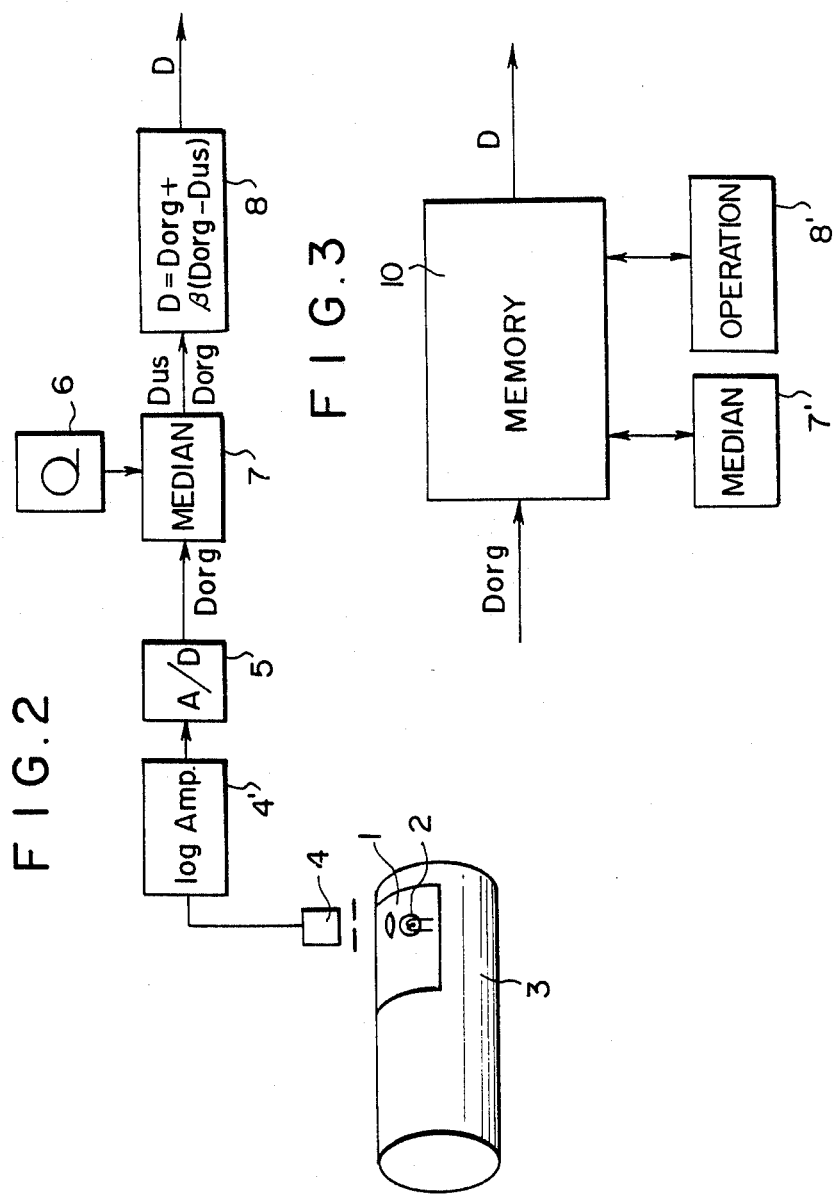

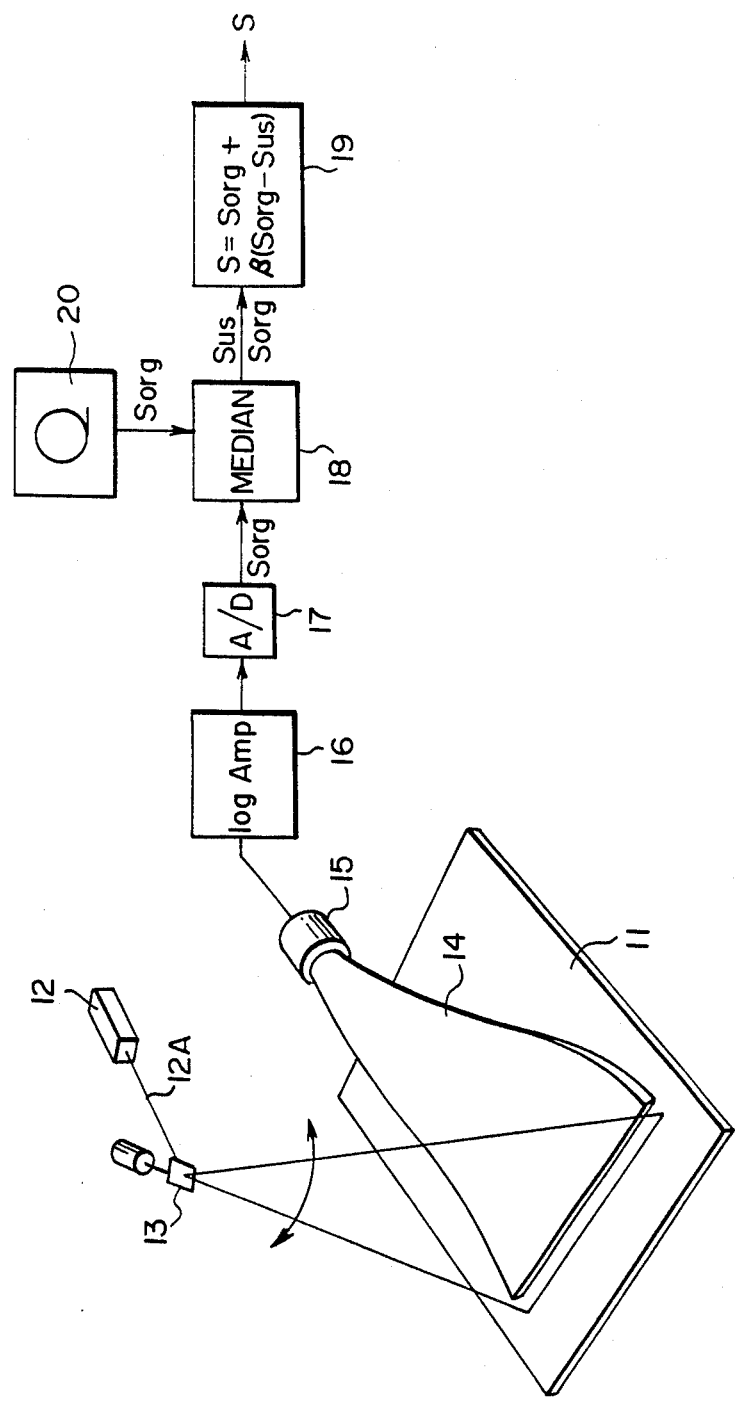

RADIATION IMAGE PROCESSING

BACKGROUND OF THE INVENTION

1. Field of the Invention

This invention relates to a radiation image processing method and apparatus therefor, and more particularly to a method of and apparatus for conducting an unsharp masking process on an image on a radiographic film (hereinafter referred to as "X-ray image") to improve the diagnostic accuracy when the X-ray image is duplicated, and further to a method of and apparatus for frequency processing an image in a system for recording and reproducing an radiation image by use of stimulable phosphor sheet.

2. Description of the Prior Art

Since X-rays are harmful to human bodies, it is desired to obtain as much information as possible by one exposure to X-rays. In general, X-ray films should have sensitivity which is high enough and latitude which is wide enough to record radiographic images together with contrast which is high enough, sharpness which is high enough and granularity fine enough to satisfy the requirements for diagnostic observation. However, these properties cannot generally be obtained at the same time due to their contradicting conditions. Therefore, a certain compromise between these requirements is practically made in preparing X-ray films.

Hence, it has been desired to improve the contrast, sharpness and granularity by image processing the X-ray image; by reading out the X-ray image and converting the image into an electric image signal, processing the signal, and reproducing a processed image with improved properties. By such an image processing, it becomes possible to enhance the quality and diagnostic accuracy of the X-ray image, to obtain as much diagnostic information as possible, and further to provide X-ray films with further improved recording properties such as sensitivity and latitude.

On the other hand, it has been known in the art (as disclosed in Japanese Unexamined Patent Publication No. 48-25523) to use a photographic film having a two-step gradient contrast in which the gradient is partly high and partly low and to conduct an unsharp masking process which emphasizes frequencies in the high spatial frequency region. This process is employed in a system in which large sized X-ray film images are duplicated on a reduced scale on small sized X-ray film to save the storage space and at the same time to maintain the high quality of the image.

This system, however, has a drawback in that noise is also increased because the high frequency component of the image signal is emphasized. Accordingly the diagnostic accuracy and image quality of the reduced scale image are not improved.

U.S. Pat. No. 4,317,179 discloses an X-ray image processing method to solve this problem. It was found that an important frequency to be emphasized is extremely low and that the conventional methods which emphasize high frequency components to improve the sharpness also deteriorate diagnostic accuracy by emphasizing noise. Accordingly, diagnostic accuracy was improved by lowering the emphasis of high frequencies and emphasizing the super-low frequency component.

The above-mentioned method of emphasizing the super-low frequency component obtains a high quality image which is more acceptable to visual sense and in which high frequency noise is comparatively decreased. In this method, an original X-ray image is scanned and converted to an electric signal and the electric signal is subjected to an image processing operation in which an unsharp masking operation described by:

$$D' = Dorg + \beta(Dorg - Dus) \tag{1}$$

is conducted (wherein D' is the density of the final X-ray image, Dorg is the density of the original image, $\beta$ is an emphasizing coefficient, and Dus is an unsharp mask density corresponding to the super-low frequency at the respective scanning point). Frequencies lower than the super-low frequency are thus emphasized.

However, in this method there some drawbacks have been discovered:

By emphasizing this particular frequency component, edges of objects in the final image are emphasized, regardless of the size of the objects as is the part of the image where a larger structured object overlaps a smaller structured body. Further, even in the area other than the overlapping part, overshooting or undershooting, ghost images to appear at the edges of objects in the final image. This will, of course, affect a diagnosis.

The above-mentioned drawbacks inherent in said prior art will now be described in more detail with reference to the drawings, particularly to FIGS. 1A and 1D which are an example in one dimension. In FIGS. 1A and 1D, the abscissa represents time (position) and the ordinate represents the level of the signal. According to formula (1), the unsharp mask density Dus as shown in FIG. 1B is subtracted from the original density Dorg as shown in FIG. 1A to obtain Dorg-Dus, which is multiplied by $\beta$ to obtain Dorg-Dus as shown in FIG. 1C. This is added to the original density Dorg to obtain an image signal having emphasized edges with overshoot A or undershoot B as shown in FIG. 1D. In this prior art method, there is an advantage: the contrast of an object is enhanced when the size of the unsharp mask is larger than the size of the object; but edges are also undesirably emphasized. The emphasis of the edges and depends upon the gradient of the edge of the object and occurs regardless of the size of the object. Thus the edges of bones or the heart are emphasized, even though these structures have large size, because they also have steep edges. The emphasized edges have overshoot or undershoot and appear as a ghost image which deteriorates diagnostic accuracy and image quality.

Various patents, for example, U.S. Pat. Nos. 4,258,264 and 4,276,473, provide a method and apparatus for recording and reproducing a radiation image of a human body or the like by use of a stimulable phosphor. In radiation image recording and reproducing system using a stimulable phosphor, the image signal can be subjected to various kinds of image processing and accordingly, is effective for enhancing the diagnostic efficiency and accuracy when it is applied to medical diagnosis.

One of the image processing methods which can be applied to enhancing the diagnostic efficiency and accuracy is a frequency processing as suggested in U.S. Pat. No. 4,315,318. This frequency processing is a method of emphasizing a particular frequency component by use of an unsharp masking process quite similar to said unsharp masking process as mentioned with reference to FIGS. 1A and 1D. In place of Dorg, Dus and D', an original signal Sorg, unsharp mask signal Sus and reproduced signal S' are employed. Accordingly, this method will also suffer from the drawbacks caused by the ghost image.

SUMMARY OF THE INVENTION

In view of the above-mentioned drawbacks inherent in the prior art radiographic system, the principal object of the present invention is to provide a method of image processing an X-ray image or a radiation image in which the frequency emphasis is conducted without causing ghost images by overshoot or undershoot.

Another object of the present invention is to provide an apparatus for image processing an X-ray image or radiation image by emphasizing a particular frequency component without causing ghost images by overshoot or undershoot.

The method and apparatus for carrying out the frequency emphasis according to the present invention is characterized in that, in contrast to said prior art frequency emphasis in which the unsharp mask density or signal (Dus, Sus) was given based on an average of the image signals of all the picture cells in the unsharp mask, the unsharp mask density or signal is based on the median (central value) of the signals of the picture cells in the unsharp mask. That is, among the digital image data within an unsharp mask consisting of $N \times N$ picture cells or elements the "median" [the $(N^2+1)/2$-th, when N is an odd number, the $N^2/2$-th or $N^2/2+1$-th, when N is an even number, data in the accumulated histogram] is adopted as the unsharp mask density or signal (Dus, Sus). Since the median is employed as the unsharp mask signal, it becomes possible to limit the size of the object which is emphasized to those having a size smaller than one half of the size of the unsharp mask. The occurrence of overshoot is thus prevented and the ghost images are eliminated.

By applying the present invention to the medical diagnosis, the blood vessels are emphasized but the edges of the large-sized structures such as ribs and the heart are not emphasized. This method is, therefore, particularly suitable for extracting blood vessel shadows in an image of lungs and provides an image of high diagnostic efficiency and accuracy. Further, it is suitable for extracting stomach walls of fine structures of bones. Since ghost images are prevented from being formed in the radiation images, the shape of the edges of bones can be correctly reproduced, which will prevent errors in diagnosis.

BRIEF DESCRIPTION OF THE DRAWING

FIGS. 1A, 1B, 1C and 1D are graphs showing the image signal in the prior art frequency processing, FIG. 2 is a schematic view showing an embodiment of an apparatus carrying out the image processing method according to the present invention, FIG. 3 is a block diagram which shows an example of a variation of a part of the apparatus, FIG. 9 is a schematic view showing another embodiment of an apparatus carrying out the image processing method according to the present invention.

DESCRIPTION OF THE PREFERRED EMBODIMENTS

Figure 4A:
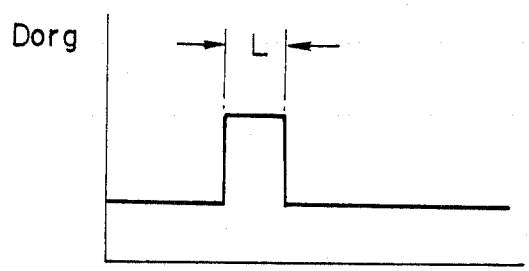
FIGS. 4A and 4E are graphs showing the image signal which is processed according to the present invention.

Now the present invention will be described in more detail with reference to several embodiments referring to the accompanying drawings.

FIG. 2 shows an embodiment of an apparatus for carrying out the method of image processing according to the present invention. A radiographic film 1 bearing X-ray image information is attached on the surface of a rotating drum 3 made of transparent material. Light from a light source 2 located in the drum 3 passes through the radiographic film 1 and is received by a photomultiplier tube 4 located outside the drum 3 which converts the image information into an electric signal. The electric image signal is converted to digital values by a logarithmic amplifier 4' and an A/D converter 5 to obtain digital values of original density Dorg.

The X-ray image information is digitized by use of a drum scanner in the above-described example, however, a plan scanner using a CCD line sensor can also be employed instead.

The image signal indicative of the original density Dorg thus obtained or the signal taken out of a memory device 6 which memorizes the original density signal Dorg thus obtained in a magnetic tape or disc is the input to a median calculating unit 7. In the median calculating unit 7, a median (Dus) of the image signal or digital data of the picture elements in an unsharp mask having the size of $N \times N$ is calculated. The calculated median Dus and the original density signal Dorg are input into an arithmetic unit 8. In the arithmetic unit 8, an operation of Dorg+$\beta$ (Dorg-Dus), i.e. frequency processing, is conducted to produce a final image density D which is frequency processed.

The above operation may either be conducted by use of a multiprocessor in which synchronization is made for every line or, as shown in FIG. 3, by non-synchronized calculation of the median calculation and the frequency processing calculation. That is, as shown in FIG. 3, it is possible to input an image density Dorg into an image memory 10, and calculate the median and the frequency processing in a non-synchronized manner in a median calculating unit 7' and a frequency processing calculating unit 8' based on the digital data stored in the image memory 10, and output a final image signal indicating the final image density D from the image memory 10. The calculation according to the example as shown in FIG. 3 is disadvantageous in that it is not a real-time processing but is advantageous in that it is possible to output an image which is based only on the median. Further, it is possible to make the calculation in the median calculating unit 7' and the calculation in the frequency processing unit 8' synchronized with each other by use of a single processor.

The output image signal is forwarded to a recording device or a reproducing device to record or reproduce an image. That is, the output signal may be recorded in a magnetic tape or disc to be stored or it may be used for reproducing a visible image on a CRT or a photosensitive material.

Figure 4B:
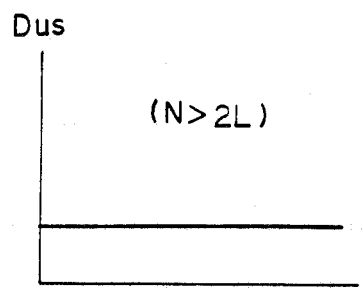

Now referring to FIGS. 4A to 4E, the effect of the frequency processing or the unsharp masking process in which the median is used as the unsharp mask signal will be described as to the case wherein the object is regarded ideally as a rectangular wave in one dimension. FIG. 4A shows the original image data Dorg. The width of the object of the image is indicated by L in FIG. 4A. When the size of the unsharp mask (N picture elements) is larger than twice of the size of the object (L picture elements), the median has a constant value as shown in FIG. 4B and frequency processing using the median will result in the image signal D as shown in FIG. 4C wherein only the part of the object is emphasized. Hence, by this method, only an object of small size will be emphasized. Further, as shown in FIG. 4C, overshoot or undershoot is not observed.

Figure 4D:
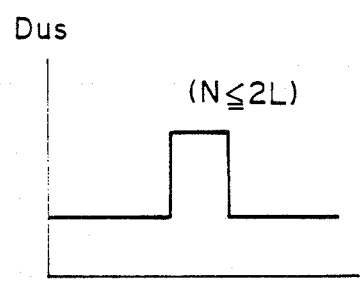
Figure 4C:
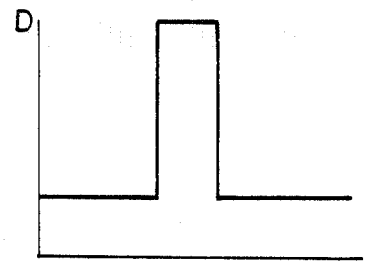
Figure 4E:
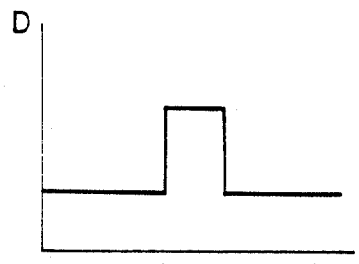

When the size of the unsharp mask (N) is not larger than twice of the size of the object (2L), the unsharp mask signal (Dus) will be the original image signal (Dorg) as shown in FIG. 4D. Therefore, the final signal will become the same as the original signal (Dorg) as shown in FIG. 4E. That is, a structure or object of a comparatively large size will not be emphasized. In this case also, no overshoot or undershoot is observed.

Though the above description is made only with respect to the ideal case in which the object is represented by a rectangular wave signal, but it has been confirmed that similar results are obtained when the present method is applied to practical medical images. In other words, while fine structures are emphasized, structures of comparatively large scale are not emphasized and even where different size objects are overlapping and there is no observed overshoot or undershoot. Accordingly, an image of high quality and high diagnostic efficiency and accuracy is obtained.

Figure 7:
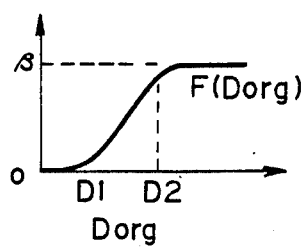
FIG. 7 is a graph showing a variation of the emphasizing coefficient.

Though according to the invention noises of high frequency are emphasized as well, the influence thereof can mostly eliminated by using an emphasizing function F(Dorg) in place of the emphasizing coefficient $\beta$ as shown in FIG. 7. That is, since the X-ray quantum noise observed in an X-ray image often appears in the low density area of the image or the low exposure area, the noise can be eliminated by using a non-linear emphasizing function which reduces the emphasizing coefficient in the low density area. Thus, the emphasizing coefficient $\beta$ can be a variable which varies according to the level of the original density Dorg. It should be noted, therefore, that the emphasizing coefficient may either be a constant or a variable.

Further, although the above description is made only with respect to the image used for medical diagnosis, the present invention can be applied to images used for industrial engineering.

Now, an example of a concrete calculating method in the median calculating unit 7 will be described in detail with reference to FIGS. 5 and 6.

Figure 5:
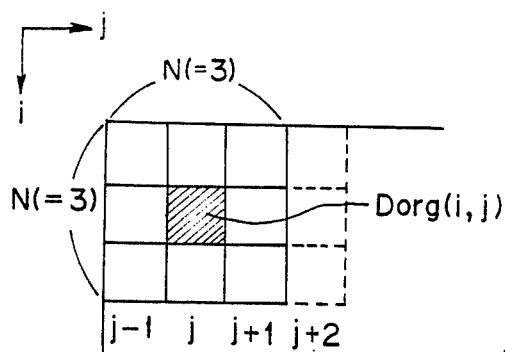
FIGS. 5 and 6 are explanatory views for the method of obtaining an unsharp mask signal.
Figure 6:
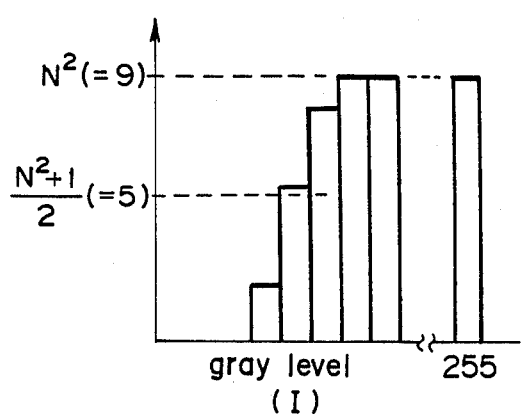

As shown in FIG. 5, it is assumed that the original density Dorg(i,j) is of the picture element at the position (i,j). The unsharp mask density or the median therefor (Dus) is obtained as follows. At first, an accumulated histogram CUMUL(I) in th mask digital image is made. (FIG. 6) Concretely, assuming that the size of the mask is N(=3)×N(=3) and the image density data of the digital data is designated by 8 bits, the number of picture elements of the mask is N×N or 9, and the median M is the 5th data in the 9. It is compared with a value in the accumulated histogram CUMUL(I). The comparing step may be initiated from 0 or from 255. Or, it may be started from the previous median which can be memorized with respect to the previous picture element.

Then, the value I where CUMUL(I) becomes CUMUL(I)$\geq$(N$^2$+1)/2 is made the median at the position of the mask. That is, this the unsharp mask signal Dus for the original density Dorg(i,j).

Then when the mask is shifted one by one in FIG. 5, the level of the signal (gray level in FIG. 5) with respect to the N-number of image signals at the (j−1)-th row is subtracted from the the accumulated histogram and thereto added is the level of the signal with respect to the N-number of image signals at the (j+2)-th row. That is, the operations of

CUMUL(K)=CUMUL(K)−1, where Dorg(i,j−1)$\leq$K$\leq$255, and

CUMUL(L)=CUMUL(L)+1, where Dorg(i,j=2)=L=255
are repeated until i=1∼N. Further, when the mask is shifted downward, a similar operation is conducted with respect to the lines (I).

Thus, the unsharp mask density or median Dus is obtained. Of course, the above-mentioned 8 bits may be 10 bits, in which case 255 becomes 1023, or more bits. Further, the shape of the mask may not be a square but may be rectangular, M×N or may be a circle of the diameter R.

Figure 8A:
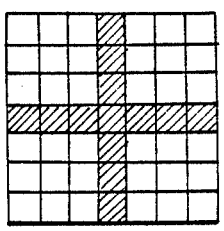
FIGS. 8A, 8B and 8C are diagrams showing various methods of obtaining the median.
Figure 8B:
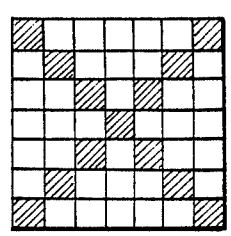
Figure 8C:
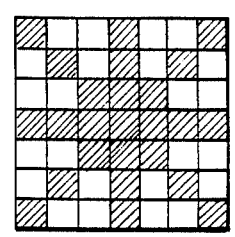

Furthermore, only a part of the picture elements in the mask may be used for obtaining the unsharp mask, taking into consideration that the spatial distribution of the image density of an X-ray image changes gently or smoothly. FIGS. 8A, 8B and 8C show some of these examples in which not all of the image data in the mask is used for obtaining the median. For example, FIG. 8A shows a pattern or a cross, FIG. 8B shows a pattern of "X", and FIG. 8C shows a star pattern which is a combination of the cross and "X". Such a method is able to shorten the calculating time since it utilizes a reduced number of digital data.

FIG. 9 shows another embodiment of the present invention which is applied to a radiation image recording and reproducing system using a stimulable phosphor sheet.

A stimulable phosphor sheet 11 in which radiation image information is stored is scanned by a laser beam 12A emitted by a laser source 12 and deflected in the main scanning direction by a glavanometer 13. The scanned stimulable phosphor sheet 11 emits light upon exposure to the laser beam 12A which is received by a photodetector 5 such as a photomultiplier tube by way of a light guide 4. The photodetector 5 converts the light carrying the radiation image information into an electric image signal Sorg. The output signal Sorg is forwarded to a logarithmic amplifier 16, then to an A/D converter 17, and further to a median calculating unit 18. The arithmetic unit 19 and a memory device 20 are equivalent to those as shown in FIG. 2 as well as said elements 16 to 18. The function of these elements is quite the same as that of the elements as shown in FIG. 2 and described hereinbefore with reference thereto with respect to density signals D, Dorg, and Dus for an X-ray image duplication.

We claim:

1. An X-ray image processing method comprising the steps of:
   scanning an original X-ray image to photoelectrically read, and produce an electrical image signal from, X-ray image information;
   converting said electric image signal into a plurality of digital signals (Dorg) which represent respective picture elements of said X-ray image;

calculating a median value (Dus) for a group of said digital signals in a mask of a predetermined size;
filtering said electrical image signal using the filter $$D' = Dorg + \beta(Dorg - Dus)$$

where D' is a filtered image signal and $\beta$ is a frequency emphasizing coefficient; and
reproducing a visible image of said X-ray image from the filtered image signal;
thereby emphasizing particular frequency components and objects in said visible image signal.

2. An X-ray image processing method as defined in claim 1 wherein the size of said mask is made more than twice as large as the objects which are to be emphasized in said visible image.

3. An X-ray image processing method as defined in claim 1 or 2, wherein said median value (Dus) is calculated using a selected group of digital signals which consists of less than all of the digital signals in said mask.

4. An X-ray image processing method as defined in claim 3 wherein said selected group of digital signals represents picture elements in said mask which are arranged in a pattern selected from the group which consists of a cross, an X, and a star.

5. A radiation image processing method comprising the steps of:
scanning a stimulable phosphor sheet carrying radiation image information; to produce an electric image signal therefrom:
converting said electric image signal into a plurality of digital signals (Sorg) which represent respective picture elements of said X-ray image;
calculating a median value (Sus) for a group of said digital signals in a mask of a predetermined size;
filtering said electrical image signal using the filter $$S' = Sorg + \beta(Sorg - Sus)$$

where S' is a filtered image signal and $\beta$ is a frequency emphasizing coefficient; and
reproducing a visible image of said X-ray image by use of the filtered electric image signal; 'thereby emphasizing particular frequency components and objects in said visible image signal.

6. A radiation image processing method as defined in claim 5 wherein the size of said mask is made more than twice as large as the objects which are to be emphasized in said radiation visible image.

7. An X-ray image processing method as defined in claim 5 or 6 wherein said median value (Dus) is calculated using a selected group of digital signals which consists of less than all of the digital signals in said mask.

8. The method of claims 1 or 5 wherein the frequency emphasizing coefficient is a variable function of the values of the digital signal.

9. In an X-ray image information recording and reproducing system which comprises:

light source means for emitting a scanning light beam which scans an X-ray image and causes reflected light or transmitted light carrying X-ray image information to be generated;
photodetector means for detecting said reflected light or transmitted light and converting it into an electric image signal; and
means for processing said electric image signal;
the improvement wherein said means for processing comprises:
converter means for converting said electric image signal into a plurality of digital signals (Dorg) which represent respective picture elements of said image;
first means which calculate a median (Dus) from a group of said digital signals in a mask of a predetermined size; and
second means which filter the electrical image signal using the filter $$D' = Dorg + \beta(Dorg - Dus)$$

where D' is a filtered image signal and $\beta$ is a frequency emphasizing coefficient.

10. An X-ray image processing apparatus as defined in claim 9 wherein said first means and said second means consist of a single signal processor.

11. In a radiation image information recording and reproducing system which comprises:
stimulating ray source means for emitting stimulating rays which scan a stimulable phosphor sheet carrying radiation image information and cause light carrying said radiation image information to be emitted by the stimulable phosphor sheet;
photodetector means for detecting said emitted light and converting it into an electric image signal;
and means for processing said electric image signal;
the improvement wherein said means for processing comprises;
converter means for converting said electric image signal into a plurality of digital signals (Sorg) which represent respective picture elements of said image,
first means which calculate a median (Sus) from a group of said digital signals in a mask of a predetermined size; and
second means which filter the electrical image signal using the filter $$S' = Sorg + \beta(Sorg - Sus)$$

where S' is a filtered image signal and $\beta$ is a frequency emphasizing coefficient.

12. An X-ray image processing apparatus as defined in claim 11 wherein said first means and said second means consist of a single signal processor.

13. The apparatus of claim 9 or 11 wherein the frequency emphasizing coefficient is a variable function of the values of the digital signal.

* * * * *